United States Patent [19]

Kato et al.

[11] Patent Number: 4,744,447
[45] Date of Patent: May 17, 1988

[54] OVERLOAD RELEASE CLUTCH

[75] Inventors: Heizaburou Kato; Masaaki Yoshino, both of Shizuoka, Japan

[73] Assignee: Sankyo Mfg. Co., Ltd., Tokyo, Japan

[21] Appl. No.: 893,970

[22] Filed: Aug. 7, 1986

[30] Foreign Application Priority Data

May 9, 1986 [JP] Japan ................... 61-104987

[51] Int. Cl.[4] ............... F16D 7/06; F16D 3/23
[52] U.S. Cl. ...................... 192/56 R; 464/30; 464/38; 464/152
[58] Field of Search ............ 192/56 R, 93 A; 464/30, 464/34, 36, 37, 38, 106, 147, 150, 152; 384/558, 568

[56] References Cited

U.S. PATENT DOCUMENTS

| | | | |
|---|---|---|---|
| 2,099,848 | 11/1937 | Grodhaus | 464/152 |
| 4,311,224 | 1/1982 | Kato et al. | 192/56 R |
| 4,541,819 | 9/1985 | Mazziotti | 464/906 |
| 4,637,502 | 1/1987 | Mayr et al. | 464/36 |

FOREIGN PATENT DOCUMENTS

| | | | |
|---|---|---|---|
| 1216622 | 5/1966 | Fed. Rep. of Germany | 464/37 |
| 55-30524 | 3/1980 | Japan. | |
| 55-107124 | 8/1980 | Japan. | |
| 586360 | 3/1977 | Switzerland | 464/36 |
| 851574 | 10/1960 | United Kingdom | 464/36 |
| 587280 | 1/1978 | U.S.S.R. | 464/36 |

Primary Examiner—Leslie A. Braun
Assistant Examiner—David A. Testardi
Attorney, Agent, or Firm—Barnes & Thornburg

[57] ABSTRACT

An overload release clutch to be mounted between rotary drive and driven members includes a recess formed on one member and a hole formed on the other member at a position axially corresponding to the recess, the recess being arcuate in the circumferential direction and extending in the axial direction. A transmission roller having a crowned peripheral surface, extending in the axial direction and having a tapered surface at least one end, is fitted in the hole so as to be rotatable on its axis and movable along the radial direction. The roller is normally urged by pressure means radially inward and engages with the recess for transmitting the rotational movement of the drive member to the driven member. When an overload torque is applied, the pressure means permits the roller to move radially outward to disengage from the recess.

8 Claims, 3 Drawing Sheets

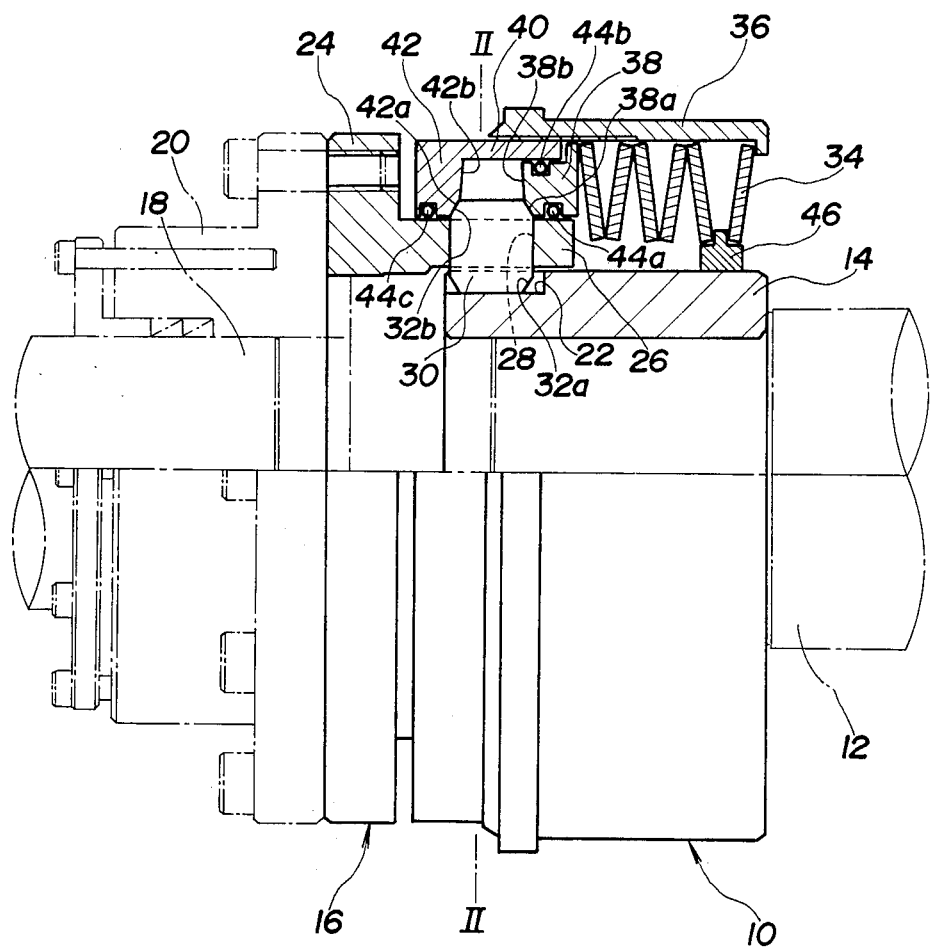
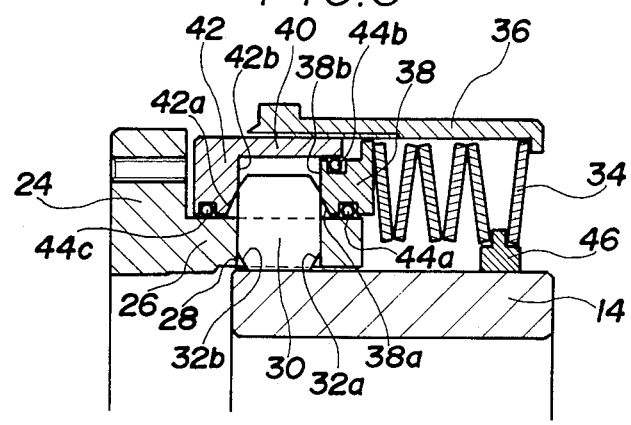

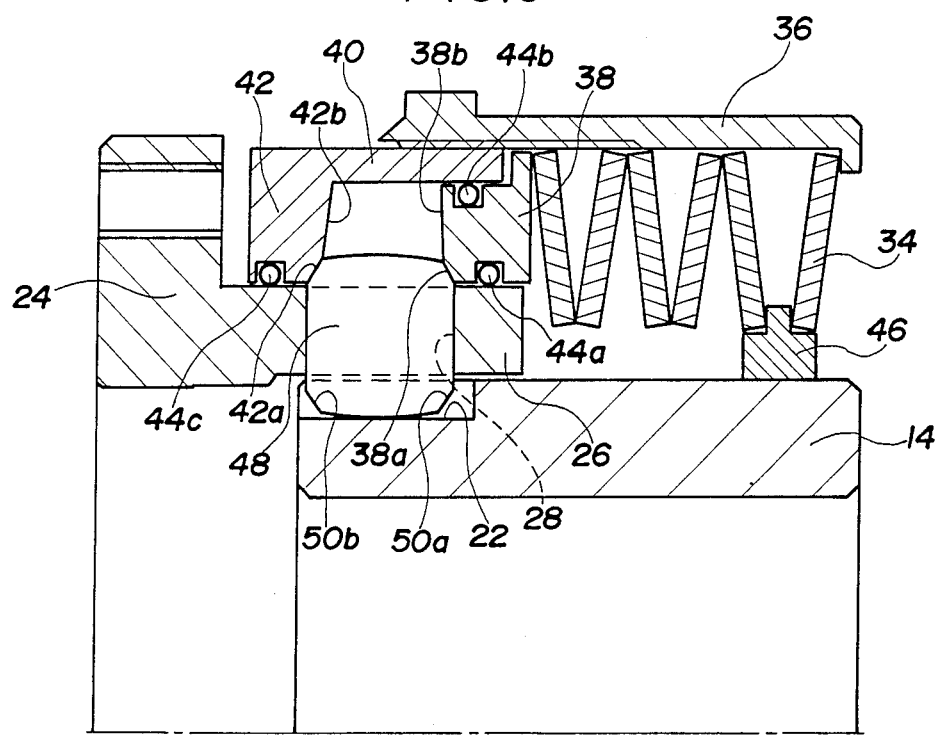

OVERLOAD RELEASE CLUTCH

BACKGROUND OF THE INVENTION

The present invention relates to an overload release clutch which transmits rotary movement of a driving member to a driven member and which serves to prevent application of torque beyond a predetermined limit.

An overload release clutch of this kind is known and disclosed, for example, in Japanese Patent Publication No. 30524/80. This known overload release clutch includes a pair of cylindrical hollow sleeves overlapping with each other, one of which is fixed on the outer periphery of a drive shaft and the other is on a driven shaft. A plurality of arcuate recesses are formed on the outer surface of the inner sleeve along the circumferential direction thereof and each extends in the axial direction thereof, while corresponding grooves are provided on the inner surface of the outer sleeve. A ball member made of steel or the like is disposed between each recess and groove and is pressed against the bottom surface of the recess by means of a compression spring, so that the inner and outer sleeves are coupled with each other. When a torque load beyond a predetermined limit, which is set by adjusting compression force of the spring, is applied between the drive and driven shafts, the balls are caused to roll out of the recesses against the compression force to thereby release the engagement between the drive and driven shafts.

However, since this overload release clutch transmits rotary movement through point contacts between the balls and the bottom surfaces of the recesses particularly in the axial direction of the sleeves, the pressure of the contact portion becomes so high that deformation may arise on the contact portion, which results in malfunction or short service life of the device. Prevention of the deformation requires lessening of the pressure on the contact portion by increasing the contact area; however, very high precision is required if the bottom surface of the recess should be formed to have the same curvature as the ball, which is impractical.

SUMMARY OF THE INVENTION

The present invention has been accomplished in view of the problems as discussed above, and it is therefore an object of the present invention to provide an overload release clutch in which a contact portion between a power transmitting member and a recess may be increased so as to decrease a pressure on the contact portion without necessity of impractical precision, and which may therefore prevent a deformation on the contact portion to thereby improve stability and durability of the device.

According to the present invention, an overload release clutch includes a recess formed on an outer surface of one of a rotary drive member and a rotary driven member and a hole formed in the other of the drive and driven members at a position axially corresponding to the recess, the recess being arcuate in the circumferential direction and extending in the axial direction of the one member. Fitted in the hole is a transmission roller of substantially cylindrical shape which extends in the axial direction and has a tapered surface at at least one end thereof, the roller being rotatable on its axis in the hole and being movable along the radial direction. Pressure means is provided for normally urging the roller radially inward through the tapered surface to thereby engage the roller with the recess and for, upon application of an overload torque, permitting the roller to move radially outward to disengage from the recess.

In one embodiment of the invention, the one member of the drive and driven members includes a sleeve fixed thereon and the other member includes fixed to an end thereof a hub having an annular flange extending toward and over the sleeve. The recess is formed on the sleeve, and the hole is formed in the annular flange.

The pressure means preferably includes a spring member fitted on one of the drive and driven members to extend along the axial direction thereof, and first and second retaining members urged by the spring member in the opposite directions so as to approach each other. At least one of the retaining members has a slanting surface for contacting the tapered surface of the roller so as to press the roller radially inward by the elastic force of the spring member.

Other objects, features and advantages of the present invention will be apparent from the following detailed description of the preferred embodiments when taken in conjunction with the accompanying drawings, in which:

BRIEF DESCRIPTION OF THE DRAWINGS

FIG. 1 is a partly sectioned side elevation showing an embodiment of an overload release clutch according to the present invention, in a torque transmitting state;

FIG. 3 is an enlarged fragmentary sectional view of the overload release clutch, in which the torque transmission is released;

FIG. 5 is an enlarged fragmentary sectional view of an overload release clutch according to another embodiment of the present invention.

DETAILED DESCRIPTION OF THE INVENTION

Figure 4:
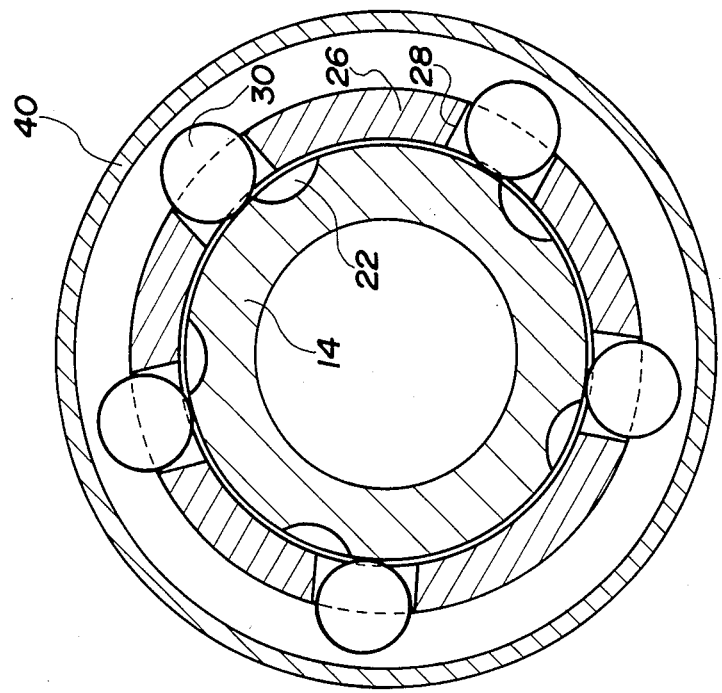
FIG. 4 is a view similar to FIG. 2 but in the released state as shown in FIG. 3.

Referring first to an embodiment of the present invention shown in FIGS. 1 through 4, a driving member 10 comprises a drive shaft 12 connected to power source such as a motor (not shown) and a cylindrical first sleeve 14 fixedly fitted over the drive shaft 12. A driven member 16 comprises a driven shaft 18 connected to a tool (not shown) to be rotated and a second cylindrical sleeve 20 mounted and fixed on the driven shaft 18. A plurality of recesses 22 are provided on the outer surface of the first sleeve 14 and are arranged at desired intervals along the circumferential direction of the sleeve 14, each recess being arcuate in transverse section and rectangular in longitudinal direction as seen from FIGS. 1 and 2. A hub 24 fixed on an end face of the second sleeve 20 and forming part thereof, is provided with an annular flange 26 which has matching holes 28 bored at positions corresponding to the recesses 22. Fitted in each hole 28 is a transmission roller 30 a part of which normally engages with the recess 22 for transmitting the rotary movement of the drive shaft 12 to the driven shaft 18, as described hereinafter.

The roller 30 is formed in a cylindrical shape extending along the axis of the first sleeve 14 and is provided at at least one end thereof with a tapered face. In the illustrated embodiment, the roller 30 has the tapered faces 32a and 32b at both ends thereof. The roller 30 is fitted in the hole 28 in such a manner that it is permitted to rotate on its axis and to move in the radial direction of the driving member 10 but is prevented from moving in the axial and circumferential directions of the driving member 10.

A disk spring 34 in the form of hollow cylinder is fitted over the first sleeve 14 and is compressed between one end of an annular pressure nut 36 and a first retaining member 38 which is forced to the left-hand side in FIG. 1. The other end of the pressure nut 36 is threadedly engaged with an outer surface of a flange 40 of a second retaining member 42, so that the compressive force of the disk spring 34 can be varied by rotating the nut on the threads. The first retaining member 38 is axially slidably supported, through O rings 44a and 44b, between the outer surface of the flange 26 of the hub 24 and the inner surface of the flange 40 of the second retaining member 42, while the lower edge of the second retaining member 42 is slidable on the outer surface of the flange 26 through an O ring 44c. Thus, the disk spring 34 forces the first retaining member 38 directly to the left-hand side and the second retaining member 42 to the right-hand side through the pressure nut 36.

The first retaining member 38 is provided at the lower left edge with a slanting surface 38a confronting the tapered face 32a of the roller 30, and the second retaining member 42 is also provided at the lower right edge with a slanting surface 42a confronting the tapered face 32b. Through engagements between the slanting surfaces 38a and 42a and the tapered faces 32a and 32b, the compression of the disk spring 34 forces the rollers 30 radially inward against the bottoms of the recesses 22. It may be readily understood that when only one end of the roller 30 is provided with the tapered face, only the confronting retaining member may be provided with the slanting surface. Further, in this embodiment, upper portions 38b and 42b of the retaining members 38 and 42 above the slanting surfaces 38a and 42a are also slanting a little; the distance between these portions decreases gradually toward the flange 40.

On the outer surface of the first sleeve 14 is fixed a retaining ring 46 which engages with the disk spring 34 to maintain the same in position. A sensor (not shown), for example, may be provided adjacent the outer surface of the pressure nut 36 in order to detect an axial displacement of the pressure nut 36.

Figure 2:
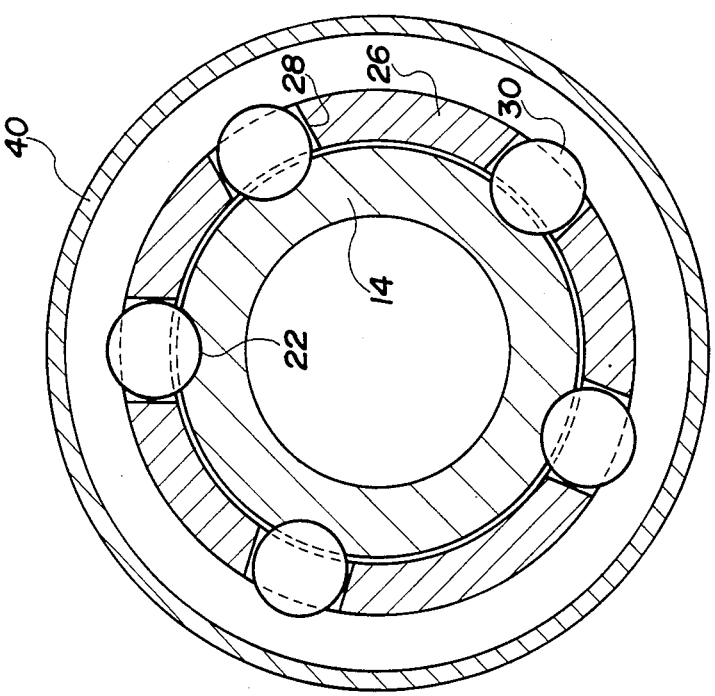
FIG. 2 is a transverse section taken on line II—II in FIG. 1.

In operation, when the parts are in a position as shown in FIGS. 1 and 2 where the rollers 30 are engaged with the recesses 22 of the first sleeve 14, rotary movement of the drive shaft 12 is transmitted through the first sleeve 14 and the rollers 30 to the hub 24 so that the driven shaft 18 fixed to the hub 24 may rotate integrally with the drive shaft 12. In this position the rollers 30 are forced to the bottoms of the recesses 22 by the compression of the disk spring 34 and it should be noted here that the roller 30, being cylindrical, make at least line contact (surface contact when the curvature of the recess is equal to that of the roller 30) with the bottom of the recess, so that the force exerted by the disk spring 34 is dispersed unlike point contact, which results in the reduced pressure.

In case that an overload beyond a limit torque, which is predetermined by adjusting the threaded engagement between the pressure nut 36 and the second retaining member 42, is applied to either the drive shaft 12 or driven shaft 18, the rollers 30 tend to move radially outward to roll out of the recesses 22 against the compressive force of the disk spring 34. At this instant, the first and second retaining members 38 and 42 are forcedly moved away from each other, that is to say, the first member 38 is moved to the right-hand side and the second member 42, as well as the pressure nut 36, is to the left-hand side while compressing the disk spring 34 further, thereby permitting the rollers 30 to move radially outward as shown in FIGS. 3 and 4. The result is that the drive shaft 12 and the driven shaft 18 are disengaged from each other for relative rotational movement. By detecting the displacement of the pressure nut 36, this disengagement may be notified to the operator. In this embodiment, the retaining members 38 and 42 are provided with the slanting portions 38b and 42b; therefore, when transmission has been disconnected, after the power source has been brought to rest, rotation of the hub 24 will return the rollers 30 to the position radially outward of the recesses 22 and by forcing the second retaining member 42 or pressure nut 36 against the spring 34 the rollers 30 will be easily received in the recesses 22. Furthermore, if desired, the slanting of the portions 38b and 42b can be increased so that the rollers 30 are being urged radially inward even in the position as shown in FIG. 3 and may automatically be received in the recesses 22 immediately after the holes 28 of the hub 24 are radially aligned with the recesses 22.

Another embodiment of the overload release clutch of the present invention is shown in FIG. 5 wherein the same structures as those of the above embodiment are designated by the same reference numerals and their explanations will be omitted. In this embodiment, the transmission rollers 48 a e crowned with a little bulge on the peripheral surfaces and, as in the above embodiment, have tapered faces 50a and 50b at both ends thereof. When the rollers 48 are pressed to the bottoms of the recesses 22 by the force of the disk spring 34 through the tapered faces 50a and 50b and slanting surfaces 38a and 42a of the retaining members 38 and 42, the contact portion between the crowned surface of the roller 48 and the bottom of the recess is not so large as in the above first embodiment but enough to disperse the spring force considerably in order to achieve the reduced pressure. Further, when the driving member 10 is not in alignment with the driven member 16, that is, misalignment arises between them, the misalignment to some extent can be absorbed by the crowning of the roller 48. The other structure and operation is the same as in the above first embodiment.

Although in the illustrated embodiments the recesses 22 are formed in the driving member 10 and the holes 28 in the driven member 16, these arrangements may be reversed. The above-mentioned urge means for forcing the rollers 30 or 48 radially inward is preferable because it can apply an exact pressure to the rollers with relatively simple structures. However, such means is not limited to the above one and can be replaced by various alterations.

It will be apparent from the above description that the overload release clutch of the present invention employs the substantially cylindrical rollers as a transmitting means for rotary movement, so that the contact portion between the rollers and the recesses may increase to thereby disperse the pressure force, that is, decrease the pressure at the contact portion. Therefore, the deformation at the contact portion can be prevented, which serves to improve stability and durability of the device.

Although the present invention has been described with reference to the preferred embodiments thereof, many modifications and alterations may be made within the spirit of the invention.

What is claimed is:

1. An overload release clutch comprising:
   a rotary driving member and a rotary driven member, one of said members including at least one recess formed on an outer surface thereof, said recess being arcuate in the circumferential direction about an axis parallel to an axis of one member, the other being formed to include at lease one hole at a position corresponding to said at least one recess;
   a transmission roller coaxial with said arcuate recess, said roller having a tapered surface on at least one end thereof and being fitted in said hole so as to be rotatable on its axis and movable along the radial direction of said other member;
   pressure means acting on said tapered surface for normally urging said roller radially inward to thereby engage said roller with said recess and for permitting said roller to move radially outward to disengage from said recess upon application of an overload torque; and
   a crowned peripheral surface on said roller to permit compensation for misalignment of the driving and driven members.

2. An overload release clutch according to claim 1, wherein said driving member includes a sleeve fixed thereon and said driven member includes a hub having an annular flange extending over and surrounding said sleeve, said at least one recess being formed on said sleeve and said at least one hole being formed in said annular flange.

3. An overload release clutch according to claim 2, wherein said sleeve is formed to include a plurality of said recesses formed at certain intervals along the circumference of said sleeve, and wherein said annular flange is formed to include a plurality of holes formed at intervals along the circumferential direction of said annular flange so that the holes in the annular flange align with the recesses in the sleeve, and wherein a plurality of said rollers are provided, one roller being situated in each of said holes.

4. An overload release clutch according to claim 1, wherein said pressure means comprises a spring member extending in the axial direction of said driving member and said driven member, the spring member urging first and second retaining members in opposite directions so as to approach each other, at least one of said retaining members having a tapered surface for contacting said tapered surface of said roller so as to press said roller radially inward.

5. An overload release clutch according to claim 4, wherein said pressure means further comprises a pressure nut supporting one end of said spring member and threadingly engaged with said second retaining member to bias the second retaining member in a first direction toward the first retaining member, the other end of said spring member abutting said first retaining member to bias the first retaining member in a second direction toward the second retaining member.

6. An overload release clutch comprising:
   a drive shaft,
   a driven shaft,
   a sleeve coupled to an end of the drive shaft, the sleeve including a plurality of recesses formed at predetermined intervals along the circumference of the sleeve, the recesses having an arcuate cross-section in the transverse plane and a rectangular cross-section in the longitudinal direction,
   a hub having an annular flange coupled to the driven shaft, the annular flange extending over and surrounding the sleeve, and the annular flange formed to include a plurality of holes aligned with the recesses of the sleeve to form a plurality of driving regions,
   a plurality of transmission rollers located in the driving regions, and
   pressure means for normally urging the rollers radially inward toward the recesses in the sleeve thereby coupling the drive shaft and the driven shaft so that the drive shaft and the driven shaft rotate together upon the application of a rotational driving force, the pressure means being selected to permit the rollers, upon the application of an overload torque, to move radially outward to disengage from said recesses to allow the drive shaft and driven shaft to rotate relative to each other, and wherein each said transmission roller includes two axial end with a crowned peripheral surface therebetween permitting compensation for misalignment of the sleeve and the annular flange, each said transmission roller having a tapered surface on at least one of said axial ends thereof from cooperation with the pressure means.

7. An overload release clutch according to claim 6, wherein the pressure means includes a first retaining member and a second retaining member, at least one of the retaining members having a tapered surface which contacts the tapered surfaces of the transmission rollers to force the rollers radially inward against said recesses, and wherein the pressure means further includes means for biasing the first retaining member and second retaining member in opposite directions so that the first and second retaining members are forced toward one another.

8. An overload release clutch according to claim 7, wherein the pressure means further includes a spring member abutting the first retaining member to bias the first retaining member in a first direction, and a pressure nut threadingly engaged with said second retaining member and supporting the other end of said spring member to bias the second retaining member in a direction opposite the first direction so that the first and second retaining members are forced toward each other.

* * * * *

UNITED STATES PATENT AND TRADEMARK OFFICE
CERTIFICATE OF CORRECTION

PATENT NO. : 4,744,447

DATED : May 17, 1988

INVENTOR(S) : Kato et al.

It is certified that error appears in the above-identified patent and that said Letters Patent is hereby corrected as shown below:

In column 4, line 33, replace "a e" with -- are --.

In column 5, line 11, after "other" insert -- member --.

In column 6, line 32, replace "end" with -- ends --.

In column 5, line 12, replace "lease" with -- least --.

In column 6, line 36, replace "from" with -- for --.

Signed and Sealed this

Thirteenth Day of December, 1988

Attest:

DONALD J. QUIGG

*Attesting Officer*    Commissioner of Patents and Trademarks